United States Patent [19]
Spickelmire

[11] Patent Number: 5,890,618
[45] Date of Patent: Apr. 6, 1999

[54] LIQUID STABILIZING BAFFLE SYSTEM

[76] Inventor: James Spickelmire, 724 S. "C", Grangeville, Id. 83530

[21] Appl. No.: 73,891

[22] Filed: May 6, 1998

[51] Int. Cl.$^6$ .................................................. B65D 25/00
[52] U.S. Cl. ............................................................ 220/563
[58] Field of Search .................................. 220/563, 734, 220/4.14, 4.15

[56] References Cited

U.S. PATENT DOCUMENTS

| | | | |
|---|---|---|---|
| 2,379,126 | 6/1945 | Welden | 220/63 |
| 2,860,809 | 11/1958 | Perry | 220/563 |
| 3,288,186 | 11/1966 | Headrick | 150/0.5 |
| 3,349,953 | 10/1967 | Conaway et al. | 220/85 |
| 3,804,292 | 4/1974 | Chiti | 220/88 |
| 3,979,005 | 9/1976 | Robinson et al. | 220/563 X |
| 4,013,190 | 3/1977 | Wiggins et al. | 220/22 |
| 4,550,848 | 11/1985 | Sucato | 220/22 |
| 4,796,773 | 1/1989 | Gerhard | 220/563 |
| 4,858,778 | 8/1989 | Patrick | 220/563 X |
| 4,927,045 | 5/1990 | Lichka | 220/88 |

*Primary Examiner*—Steven Pollard
*Attorney, Agent, or Firm*—Wells, St. John, Roberts, Gregory & Matkin P.S.

[57] ABSTRACT

A liquid stabilizing baffle system is described in which a plurality of elongated strips are provided, each being formed of a flexible spring material. Each strip includes longitudinal side edges joining opposed ends. At least one end hole is formed in each strip inwardly adjacent each end, and each strip is foldable into a loop configuration with ends overlapping. Fastener members are provided to be received through aligned end holes of the strips. A connector is provided on each strip, configured to enable a plurality of the strips to be linked in succession with the strips folded into loop configurations to form a strand.

17 Claims, 10 Drawing Sheets

LIQUID STABILIZING BAFFLE SYSTEM

TECHNICAL FIELD

The present invention relates to stabilization of fluids using baffles.

BACKGROUND OF THE INVENTION

It has long been recognized that free flowing fluids can be dangerous to balance and control of vehicles. Tankers carrying less than full tanks of any fluid risk turnover when cornering, due to the centrifugal movement of the fluid to the outside dimension of the tank during the turn. The fluid weight will shift quickly and dramatically to the outside of the turn, upsetting the balance of the supporting vehicle. At best, this hinders proper vehicle control; at worst, the shifting weight will cause the vehicle to roll over.

Free fluid in smaller tanks also represents a problem even where weight shifting is not a serious problem. Shifting chemicals in a agricultural chemical tank, for example, can affect the application rate of the chemical. The chemical may shift away from the intake of the application pump, disrupting fluid flow to the pump even though sufficient fluid is available in the tank. Still further, sloshing fluids in tanks causes repeated stressing of the tank walls. Such repeated uneven stressing causes the material of the tank walls to gradually work-harden and fail.

Free fluid in nature in the form of waves and current may also be a great cause of erosion. Even structural seawalls and breakwaters may be broken and eroded by exceptional wave action that may occur during storms or flooding.

Clearly there has been a long felt need for an apparatus by which wave or fluid current forces may be dampened. The present apparatus is provided to fulfill this need as will be understood from the following description.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
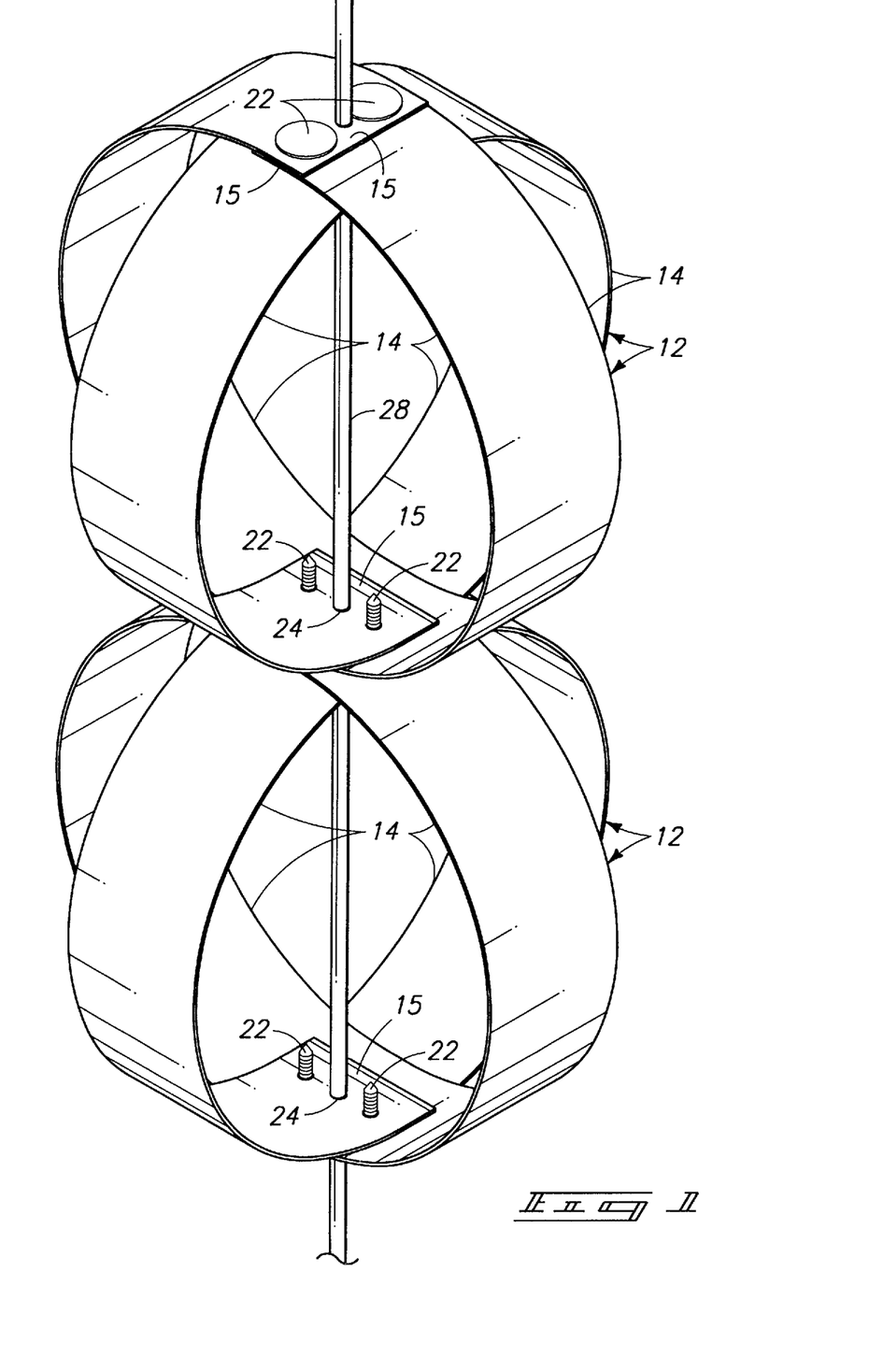
FIG. 1 is a fragmented perspective view showing two baffle components connected in succession along a link.
Figure 2:
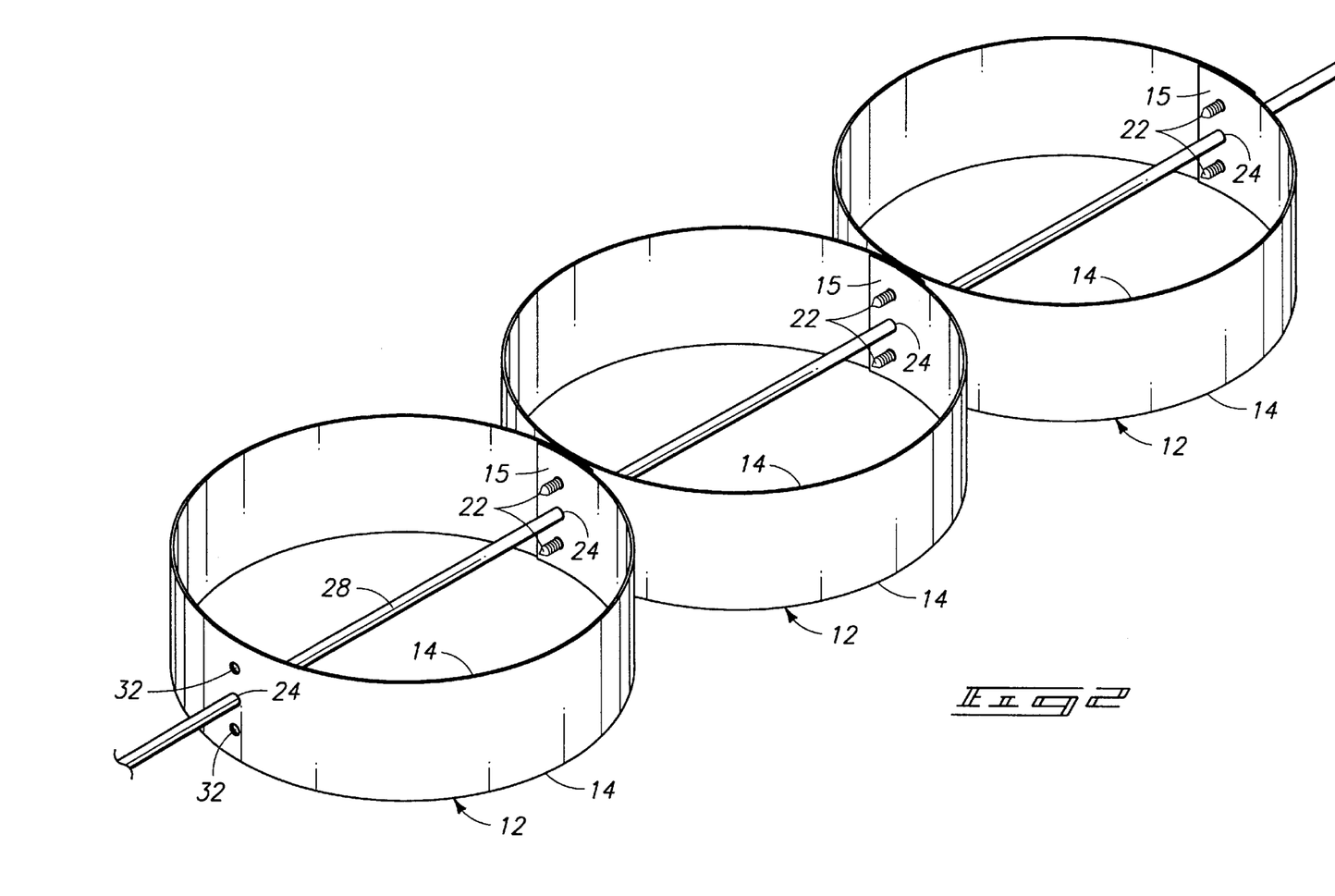
FIG. 2 is a fragmented perspective view showing three single baffle components arranged in succession.
Figure 10:
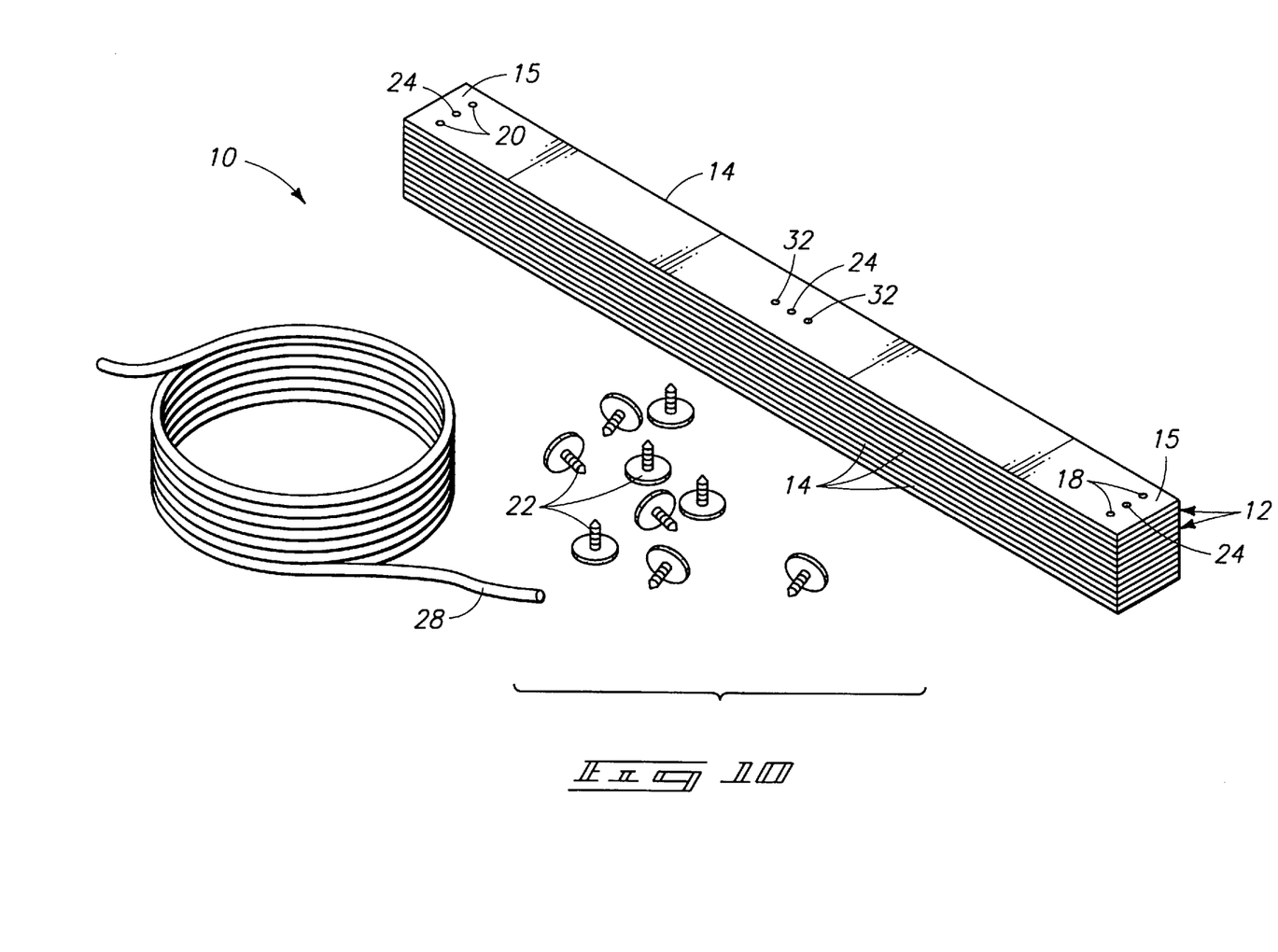
FIG. 10 is a perspective view representing a disassembled system of baffle components.

A liquid stabilizing baffle system embodying preferred features of the present invention is generally designated in the accompanying drawings by the reference numeral 10. The complete system 10 may be provided in an assembled condition as partially shown in FIGS. 1, 2, and 11, or may be provided as a kit, ready for assembly as shown in FIG. 10. Further, the system may be formed using a succession of baffle components as shown in FIGS. 1 and 10, with baffle strip components formed in a succession of three dimensional cruciform "spheres", or as a succession of flat annular loops (FIG. 2). The components may be linked together in single strands as shown, or multiple strands of the components may be formed and joined in a matrix of whatever shape is desired. For example a number of rows of the baffle components could be made into a flat rectangular matrix, or a series of rows and columns could be formed into a cubic configuration. The combination of configurations is almost without limit.

In a preferred form, the present system is made up of a plurality of elongated strips 12, each formed of a flexible spring material such as polyethylene plastic. It has been found that polyethylene is a desirable material for the strips since the material is relatively impervious to most liquids. Further, polyethylene includes resilient or spring-like properties that are most desirable for the desired energy absorbing effect in the present baffle system 10.

Figure 9:
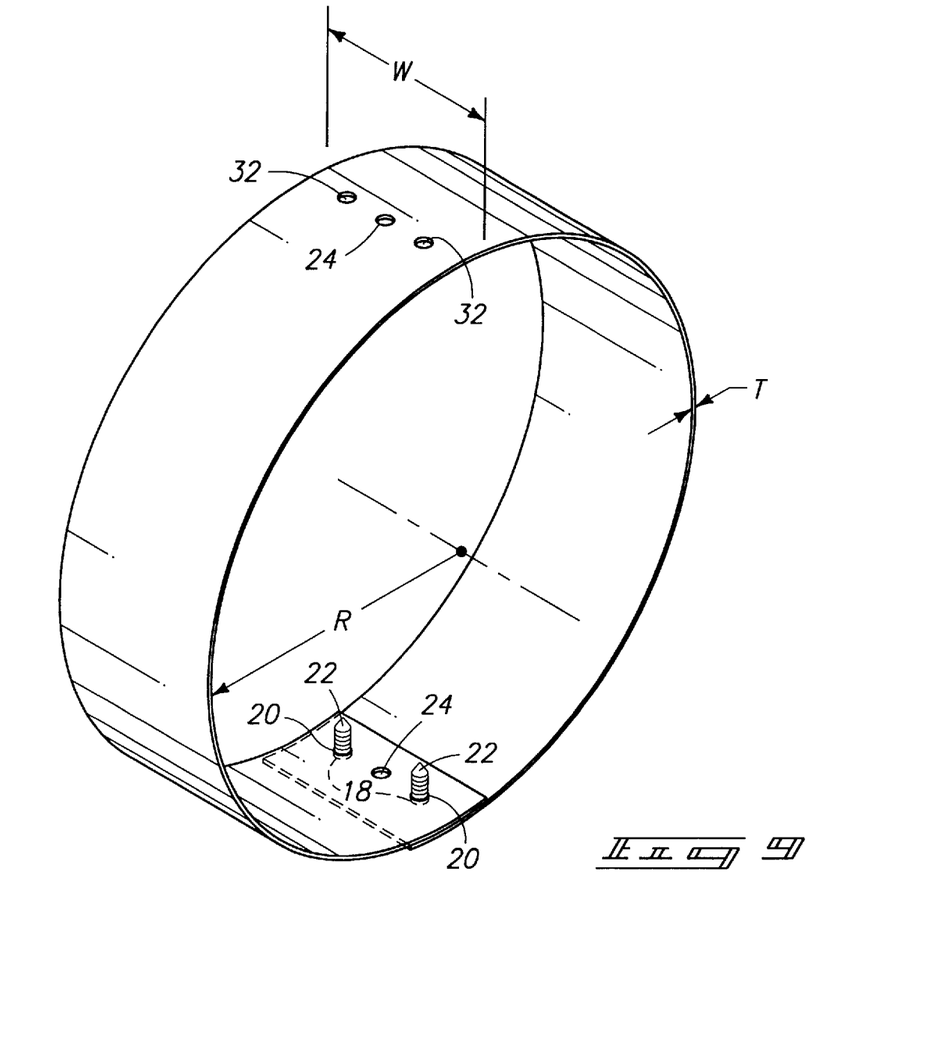
FIG. 9 is a perspective view of a strip formed in an annular configuration with preferred dimensions labeled thereon.

Each strip 12 is preferably rectangular, including longitudinal side edges 14 joining opposed ends 15. The strip includes a preferred width dimension W (FIG. 9) extending transversely of the strip length between the sides 14. The width dimension may vary according to need, but will remain within an approximate relationship with the size of a loop formed by bending the baffle until the ends 15 overlap. The radius of the loop is indicated in FIG. 9 at R, and the thickness between inside and outside surfaces 16, 17 respectively is designated at T.

Of course, the length dimension or circumference C (FIG. 3) of the strips will vary depending upon the desired radius R of the loops to be formed, according to the formula $C=2\pi R$. Using the above dimensional indicia, the width W is preferred to be no greater than approximately 0.6 R, and the thickness T is preferably approximately 0.0125 R. Thus by way of example, a strip 12 formed into a loop having a radius R of 5 inches will preferably have a width dimension W of approximately 3 inches and a thickness dimension T of approximately 0.0625 inches. Likewise, a strip formed into a loop having a radius of 36 inches will have a width W of 21.6 inches and a thickness dimension T of 0.45 inches. This relationship is given for the preferred polyethylene strip material and has been found to be preferred for obtaining the maximum fluid energy absorption results known at the present time.

Each strip 12 includes at least one end hole 18, 20 formed inwardly adjacent each end 15. Preferably, there are two pairs of such holes 18, 20 at either end, spaced apart across the strip at equal distances. The end holes 18, 20 are provided to receive barbed or other appropriate fastener members 22 which are used to secure the ends together. In a preferred form, the fastener members are one-way brads with a barbed external shank that may be pressed through the holes but that will not permit easy removal. Other forms of fasteners such as nut and bolt combinations may also be used.

Figure 3:
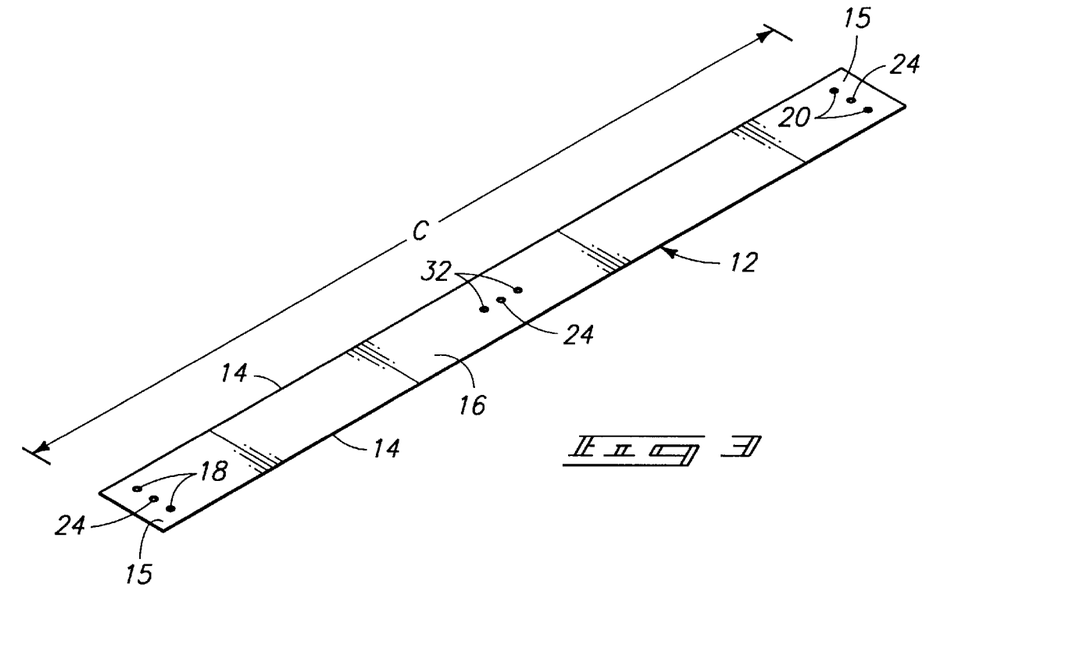
FIG. 3 is a perspective view of a single strip of spring like material used with the present system.
Figure 4:
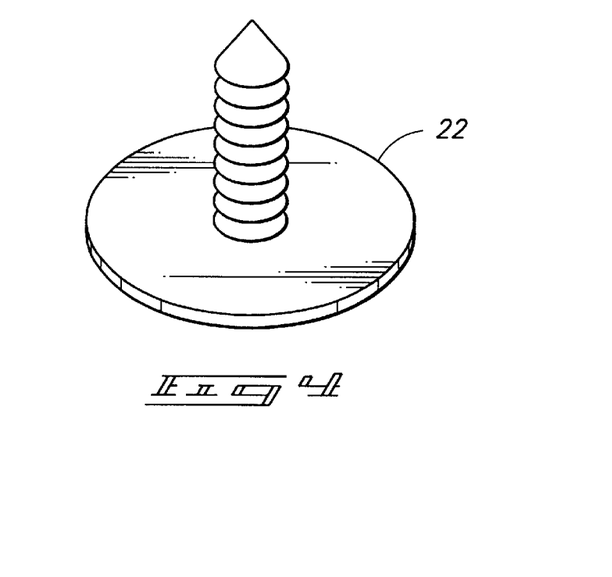
FIG. 4 is an enlarged perspective view of a fastener used with the present system.

Each of the strips 12 are foldable into a loop configuration with the ends 15 overlapping and with the end holes 18, 20 aligned to receive at least one and more preferably two of the fastener members 22 (FIG. 3). The fastener members secure the strip material in the loop configuration which, due to the inherent nature of the material, will deform upon application of force in a radial direction.

Figure 13:
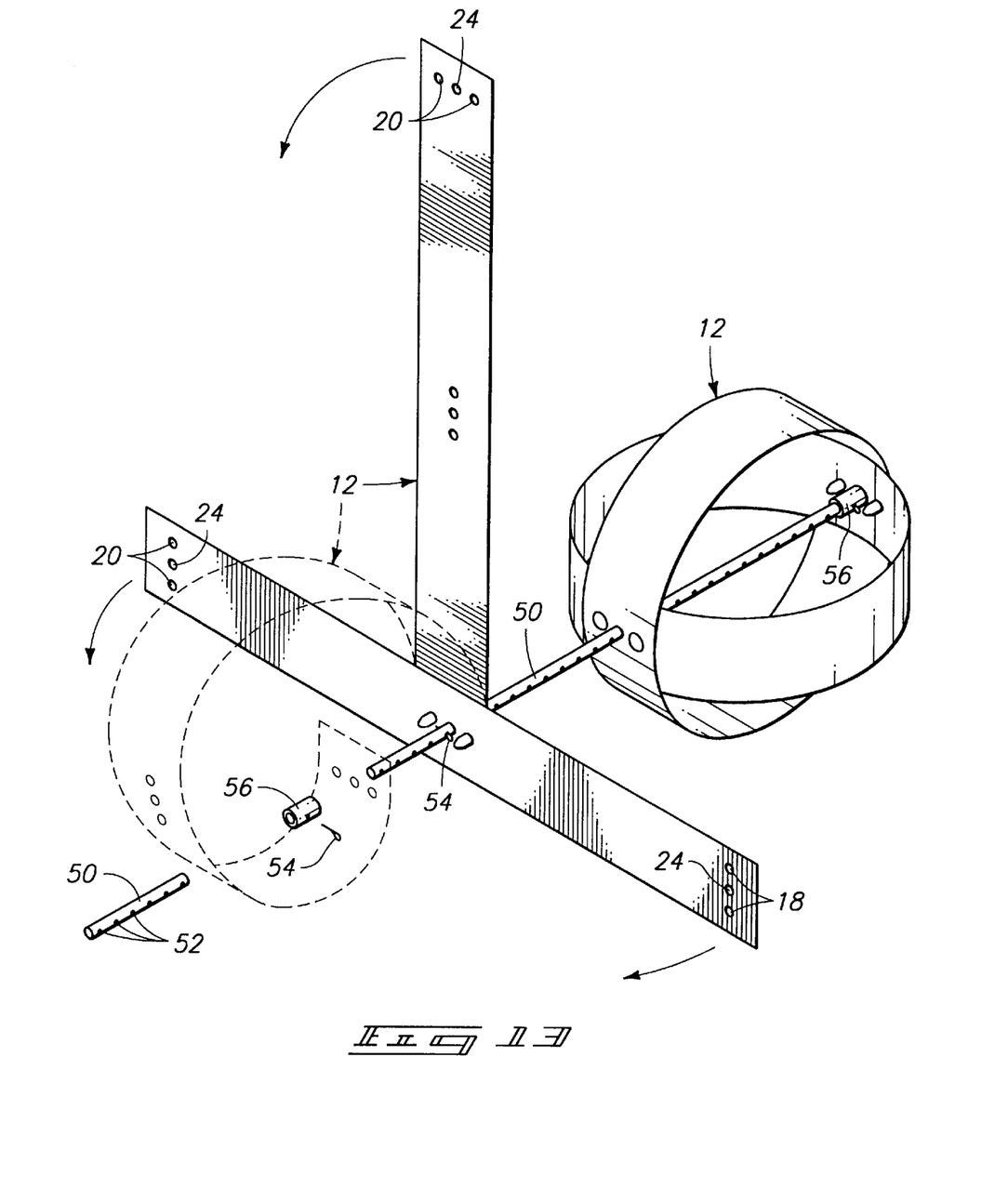
FIG. 13 is a perspective exploded view of a second preferred system in which a rigid link in the form of a rod and collars are used.

A connector member is preferably provided along each of the strips configured to enable linking a plurality of the strips in succession with the strips folded into loop configurations. In a preferred form, the connector member is simply comprised of an extra hole 24 formed through the thickness dimension of the strip. Most preferably, three such holes 24 are provided along the length of each strip, with one at each end in lateral alignment with holes 18, 20, and another at the longitudinal center of the strip. The holes 24 are substantially diametrically opposed when the strips are formed into loops, providing a passageway for a connecting link 28 (FIGS. 1, 13). The link 28 is used to interconnect a series of loops in succession, in relatively loose confinement to interact with one another, and to enable accurate placement and retrieval of the system.

In a first preferred form, the link 28 is comprised of a flexible cord, configured to join the strips through the holes 24. In a second preferred form the link is comprised of rigid lengths of rod extending through the holes 24 and joined by collars, the collars being spaced apart along the joined sections of rod to enable adjustment of the rod length and to abut the strips to hold the loop configurations stable.

Figure 11:
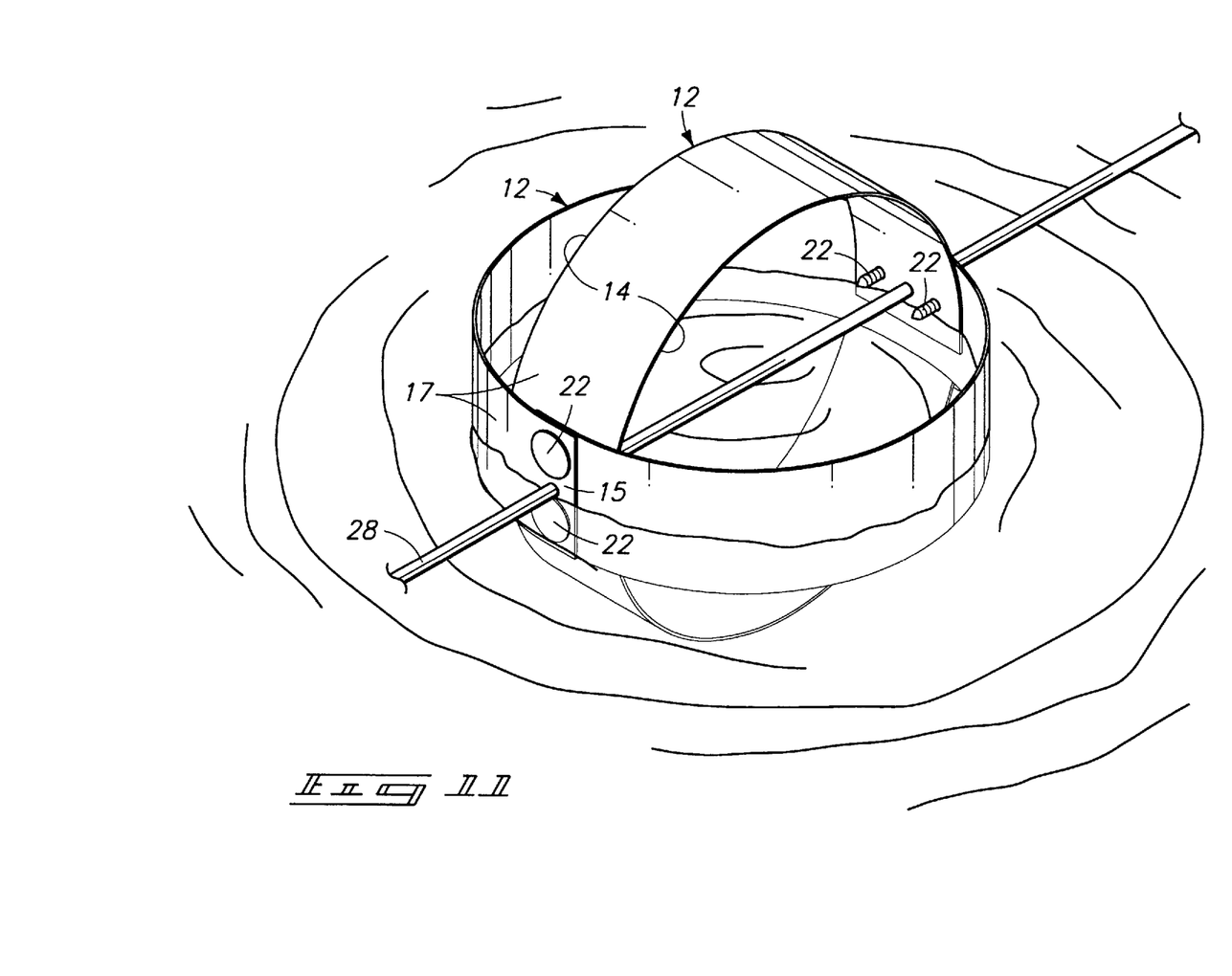
FIG. 11 is a view of a baffle component shown floating in a fluid.

In a preferred embodiment a central hole, or more preferably a pair of holes 32 are provided, at the approximate longitudinal center of each strip on either side of a longitudinally centered hole 24. These holes 32 are longitudinally aligned and spaced apart the same distances as the spacing between the end holes 18 and 20 to permit two of the strips to be formed together and held in a cruciform configuration of loops as shown in FIGS. 1 and 11. The process for interconnecting two of the strips into this configuration is shown in the succession of FIGS. 5–8.

Figure 5:
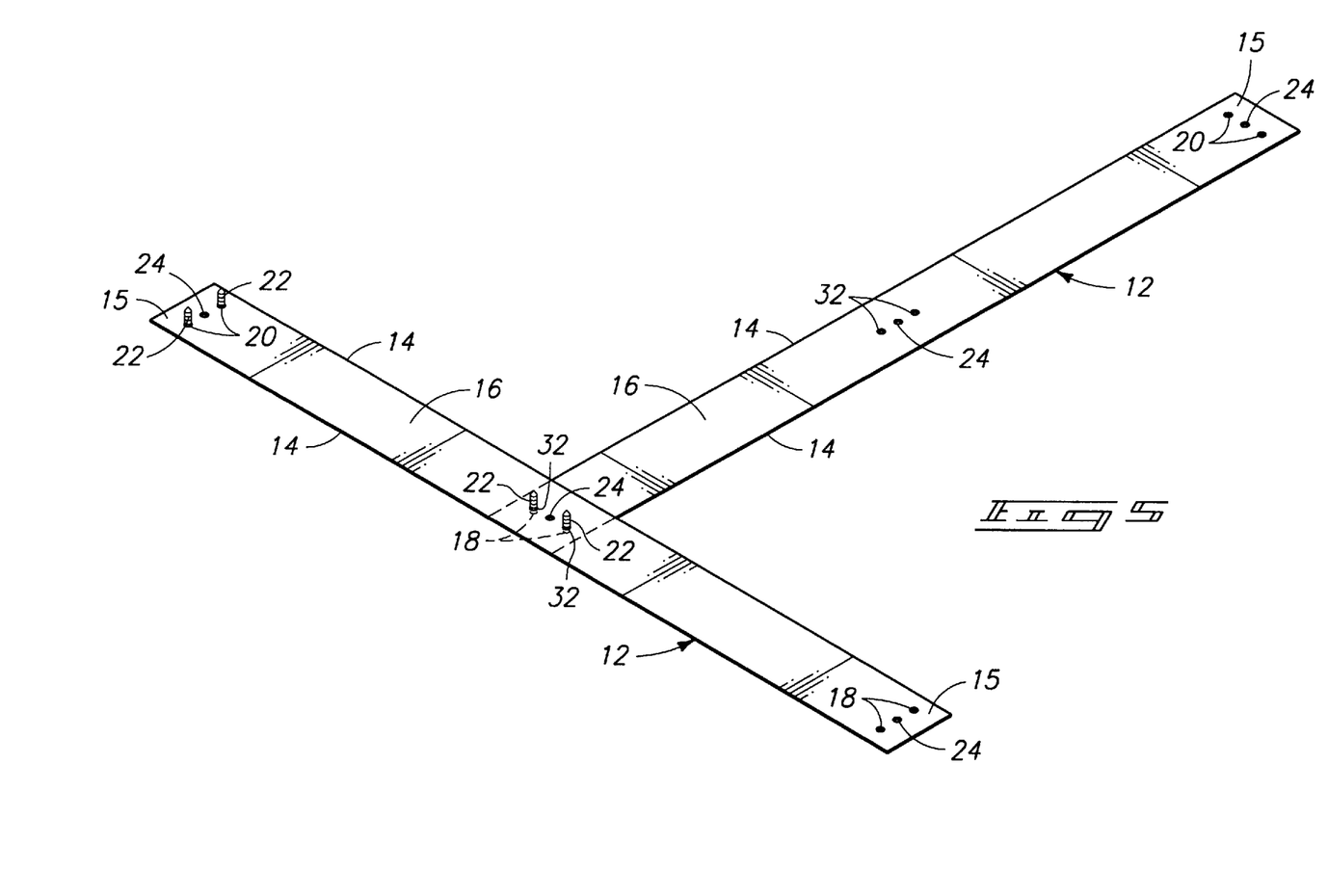
FIGS. 5–8 are a succession of views showing assembly of a baffle component using two of the strips shown in FIG. 3.

First, two strips are arranged in a T-shaped orientation with the end holes 18 of one strip aligned with central holes 32 of the other strip (FIG. 5). Barbed fastener members 22 are pushed through the aligned holes 18, 32 from underneath the two overlapping strips. Additional fasteners 22 are also pushed up through end holes 20 in one of the ends of the cross part of the T shape.

Figure 6:
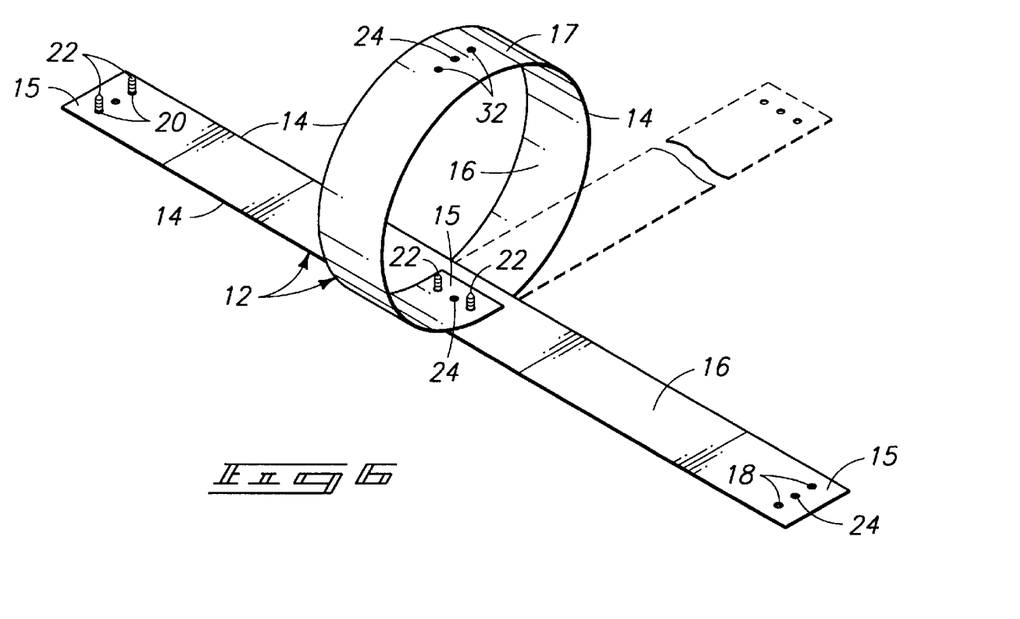

Next, the free end of the leg of the T configuration is bent over from the dotted line position to the solid line position shown in FIG. 6. The end holes 18 at the bent end of the strip are secured to the projecting ends of the fastener members 22 that extend through the central holes 32 and end holes 18 at the juncture of the "T" shape. The first loop is now formed.

Figure 7:
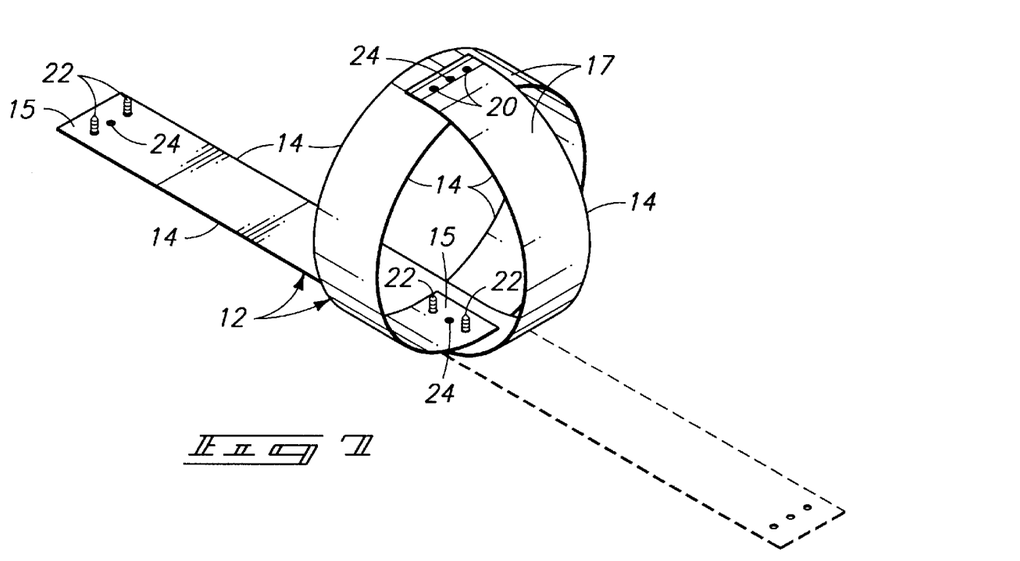
Figure 8:
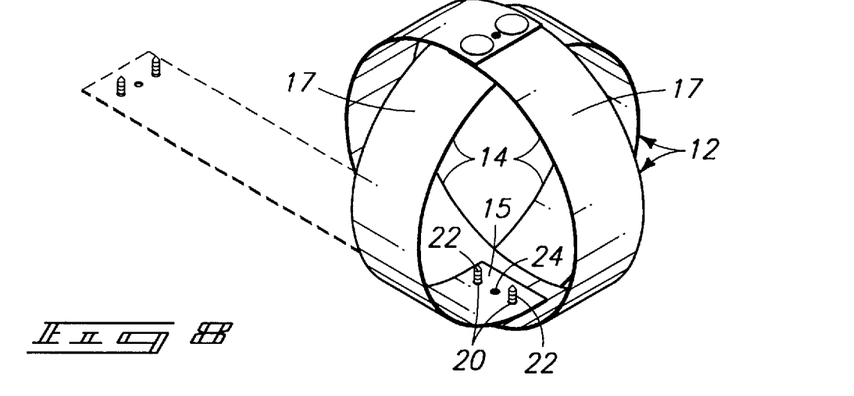

Next, the free end (without fasteners) of the remaining strip is bent over and positioned adjacent the formed loop, with the end holes 20 aligned with the central holes 32 in the previously formed loop (FIG. 7). This end is held in place while the remaining strip end is bent up and over until the fasteners are aligned with the secured central and end holes. The fasteners 22 are then pushed down through the aligned holes to complete formation of the intersecting loop or cruciform configuration.

Figure 12:
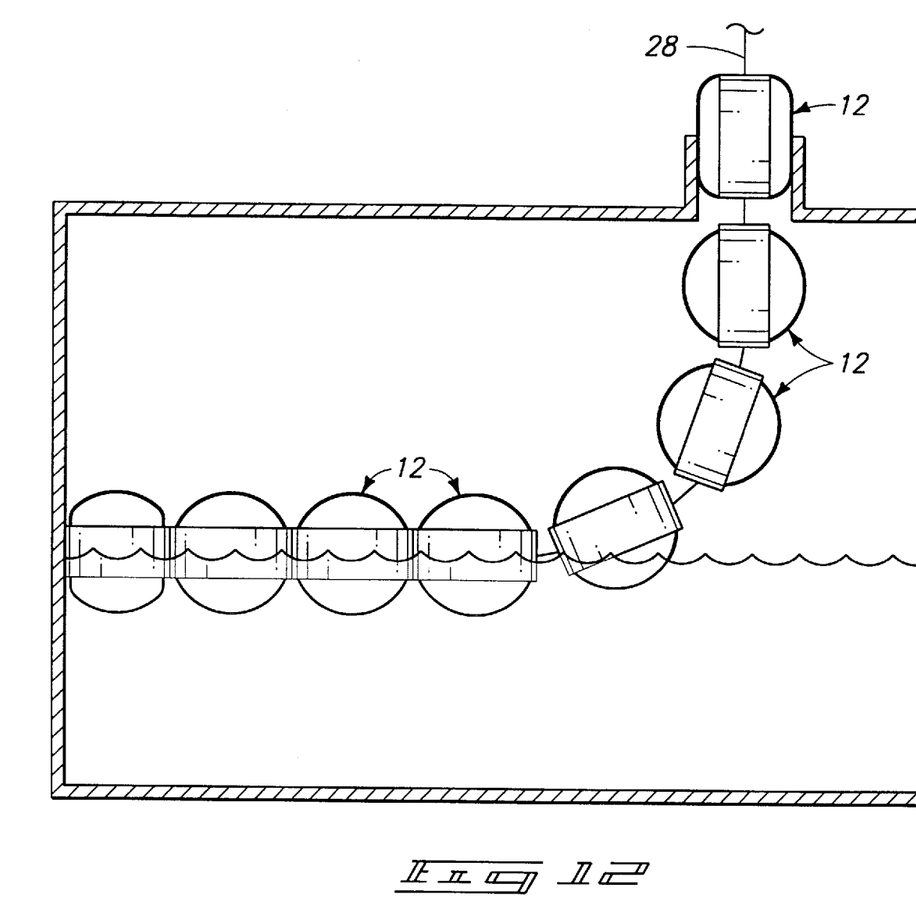
FIG. 12 is a diagrammatic view showing the present baffle system being installed in a tank, the tank being shown in section.

A baffle element formed in the above manner has certain advantages in use especially in tanks as shown in FIG. 12. A number of the elements are formed together in pairs as described above, then threaded onto the link which in this instance is preferably in the form of a flexible cord. The strand of baffle elements may then be pressed through an opening in a tank and into the tank interior.

It is preferable that enough baffle elements be pressed into the tank so that the strand will double back onto itself several times inside the tank. Further, the number of baffle elements in the tank should be sufficient to span the length and breadth of the tank with successive baffles engaging and slightly compressing one another. Wave or sloshing action of the liquid against the baffle elements will cause the elements to compress radially, absorbing the force of the shifting liquid and effectively baffling such motion.

A strand of the baffles may also be used outside tanks, as wave breaks or as buffers against a seawall or earthen embankment to ameliorate erosion caused by current and wave action. The strand of single strip loops shown in FIG. 3 is particularly suited for placement along beaches, stream embankments, seawalls, piers, dams, or other selected surface with the longitudinal side edges 14 of the loops placed substantially parallel to the water surface. The loops will flex almost indefinitely without observable wear, between the engaged surface and the wave or current forces, while protecting the adjacent surface against erosion.

A strand of the baffles may also be used as a wave break in open water, to calm an enclosed water surface within a swimming, boat docking or other area where calm water is desired. Here the cruciform baffle configurations are best used. The strand is placed along a desired line or lines about the perimeter of the area. One of the strip loops in each buoyant cruciform shape will always be at least nearly horizontal (parallel to the water surface as shown in FIG. 11) and the remaining strip (of the cruciform shape) may be used to resiliently bolster the horizontal baffle against deformation due to wave action.

Advantages are gained in circumstances where the system may be used in open areas (such as wave brakes) or in open tanks (which may be closed after installation of the system) through use of the link in the form of rigid interconnected rods 50. As shown in FIG. 13, a series of individual rods 50 may be provided in the present system, to be threaded through the central holes 24 of the strips. The individual rods 50 may be provided with spaced holes 52 along the rod lengths, to receive locator pins 54. The pins 54 may be used to secure collars 56 to the rods 50. The pins 54 may also be used to hold the engaged sheets in their loop configurations along the rod or rods.

The collars 56 may be used to receive and join ends of successive rods 50 together and thereby adjustably control the assembled rod length. The collars 56, being of larger diameter than the central holes 32 may also be used to provide spaced abutment surfaces to secure and hold the engaged strips in their loop configurations.

It is also noted that the pins 54 may also serve as "collars" for the purpose of abutting and holding the engaged strips in the loop configurations. This is accomplished simply by inserting the locator pins 54 at locations along the assembled rod length adjacent the strips, to prevent slippage, expansion or contraction of the loop configurations along the link.

Assembly of the system using rods 50 as the link member is accomplished in a somewhat different manner than described above. The strips are initially assembled in the "T" configuration as shown in FIG. 5. Next, a rod is inserted through the aligned central holes 24 at the juncture of the cross member and leg of the "T" shape.

Once the junction of the "T" shaped configuration is threaded onto the rod (as shown in FIG. 13), the end of the "leg" strip is bent downwardly (as shown by dashed lines) and its central hole 24 is threaded onto the rod. This forms a single loop with the remaining central hole 24 of the bent strip aligned with the end of the rod. The collars (if used) must be threaded onto the rod at this time, before the rod end is fitted through the remaining hole 24 in the strip. Next the remaining ends of the cross member strip are bent over and their respective central holes 24 are threaded onto the rod end, completing the cruciform configuration. The fasteners 22 are then secured to finish assembly of the baffle.

The assembled baffle can be flexibly secured along the rod by locator pins 54, which may now be used to secure the collars in place along the rod, inside the baffle. As an alternative, and if desired, the pins 54 may be used alone to abut with the adjacent surfaces of the strips.

It is pointed out that the present system may be provided in a kit form as exemplified in FIGS. 10 and 13. With this arrangement, the system may be easily transported and stored prior to use. The system may thus be easily transported in extremely compact condition and stored in confined areas until such time that assembly and use is desired. The kit form is especially beneficial for areas needing a form of emergency readiness, for example against potential embankment erosion damage due to periodic flash flooding.

Further, the user may adjust the appropriate size of the assembled strand or strands of baffle elements simply by selecting the number of strips to be used. Thus, for example, a farmer using the baffle system in a chemical spray tank may obtain a sufficient number of the strips to effectively baffle the tank by pressing one after another baffle element (along a link in the form of a flexible cord) into the tank until desired baffling is obtained. Similarly, a resort operator could assemble one or more strands of sufficient length to cordon off a desired swimming or docking area, simply by adding successive baffle elements along one or more links until a desired length is obtained.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A liquid stabilizing baffle system, comprising:
   a plurality of elongated strips formed of a flexible spring material, each including longitudinal side edges joining opposed ends;
   at least one end hole formed in each strip inwardly adjacent each end;
   a plurality of fastener members;
   each strip being foldable into a loop configuration with ends overlapping and with the end holes aligned to receive one of the fastener members; and
   a connector member configured to enable linking a plurality of the strips in succession with the strips folded into loop configurations.

2. The liquid stabilizing baffle system of claim 1, wherein each strip includes a connector member comprised of a central hole situated substantially centrally of the strip length.

3. The liquid stabilizing baffle system of claim 1, wherein each strip includes a connector member comprised of a central hole situated substantially centrally of the strip length; and
   a link extending through the central holes in the strips, joining the strips together.

4. The liquid stabilizing baffle system of claim 1, wherein each strip includes a connector member comprised of a central hole situated substantially centrally of the strip length; and
   a link comprising a flexible cord configured to extend through the central holes in the strips, joining the strips together.

5. The liquid stabilizing baffle system of claim 1, wherein each strip includes a connector member comprised of a central hole situated substantially centrally of the strip length; and
   a link comprising an elongated rod configured to extend through the central holes in the strips, joining the strips together; and
   collars on the link, spaced apart thereon to engage the strip and hold the strips in the loop configurations.

6. The liquid stabilizing baffle system of claim 1, wherein each strip is formed of polyethylene plastic material.

7. The liquid stabilizing baffle system of claim 1, wherein pairs of said strips are folded into loops that intersect one another at substantially right angles and that are formed about an approximate common point.

8. The liquid stabilizing baffle system of claim 1, wherein:
   each strip is formed of polyethylene plastic material;
   the loop configuration is centered substantially on an axis;
   the strip is folded on an approximate radius from the central axis;
   the edges are axially separated by a width dimension less than the radius.

9. The liquid stabilizing baffle system of claim 1, wherein:
   the loop configuration of each strip is centered substantially on an axis;
   each strip is folded on an approximate radius from the central axis; and
   the edges of each strip are axially separated by a width dimension less than the radius.

10. A liquid stabilizing baffle element, comprising:
    a substantially circular loop formed of a flexible spring-like buoyant plastic strip on a radius from a central axis;
    the loop including substantially annular side edges spaced apart axially by a width dimension;
    the loop further including substantially concentric annular outer and inner surfaces joining the side edges and spanning the width dimension;
    wherein the inner and outer surfaces are spaced apart radially by a thickness dimension;
    wherein the thickness dimension is less than the width dimension and the width dimension is less than the radius; and
    a connector member on one of the surfaces configured to facilitate substantial tangential connection of said loop to another loop substantially identical to said loop.

11. The liquid stabilizing baffle element of claim 10, wherein the loop is formed of polyethylene plastic.

12. The liquid stabilizing baffle element of claim 10, wherein the loop is formed of polyethylene plastic and the thickness dimension is approximately 0.0125 times the radius.

13. The liquid stabilizing baffle element of claim 10, wherein the loop is formed of polyethylene plastic and the thickness dimension is approximately 0.0125 times the radius, and wherein the width dimension is no greater than approximately 0.6 times the radius.

14. The liquid stabilizing baffle element of claim 10, wherein the width dimension is no greater than approximately 0.6 times the radius.

15. The liquid stabilizing baffle element of claim 10, wherein the connector member is comprised of a hole formed through the thickness dimension of the loop configured to receive a connector link.

16. A liquid stabilizing baffle element, comprising:

a pair of substantially circular loops formed of flexible spring-like buoyant plastic strips on substantially equal radii from a central point, the loops intersecting one another at substantially right angles to form a substantially three dimensional circular cruciform configuration;

each loop including substantially annular side edges spaced apart axially by a width dimension;

each loop further including substantially concentric annular outer and inner surfaces joining the side edges and spanning the width dimension;

wherein the inner and outer surfaces of each loop are spaced apart radially by a thickness dimension;

wherein the thickness dimension of each loop is less than the width dimension thereof and the width dimension is less than the radius thereof; and a connector member on one of the surfaces configured to facilitate substantial tangential connection of said loop to another pair of loops substantially identical to said pair of loops.

17. The liquid stabilizing baffle element of claim 16 wherein the loops are formed of polyethylene plastic.

* * * * *